May 6, 1924.                     1,492,572
W. L. MARDEN
WHEEL FOR COUNTING MACHINES
Filed Jan. 24, 1923

Inventor
William L. Marden
By his Attorneys
Redding, Greeley, O'Shea & Campbell

Patented May 6, 1924.

1,492,572

UNITED STATES PATENT OFFICE.

WILLIAM L. MARDEN, OF NEW YORK, N. Y., ASSIGNOR TO NEPTUNE METER COMPANY, OF NEW YORK, N. Y., A CORPORATION OF NEW JERSEY.

WHEEL FOR COUNTING MACHINES.

Application filed January 24, 1923. Serial No. 614,534.

*To all whom it may concern:*

Be it known that I, WILLIAM L. MARDEN, a citizen of the United States, residing in the county of Queens of the city of New York, in the State of New York, have invented certain new and useful Improvements in Wheels for Counting Machines, of which the following is a specification, reference being had to the accompanying drawings, forming a part hereof.

This invention has relation particularly to the production of the number wheels of registers. Such number wheels have the digits marked upon their peripheries so that they can be read through the sight opening of the registered case and are mounted upon a common axis. Each such number wheel has combined therewith on one side a gear through which it receives motion from the primary actuator or the next preceding number wheel, as the case may be, and on the other side a mutilated gear by which the next succeeding number wheel is advanced through one space as the preceding wheel completes a rotation. Heretofore such number wheels have usually been made as solid discs, with the driving gear sometimes formed on the disc and sometimes formed separately and secured thereto and with the transmitting teeth on the other side, sometimes formed with the disc and sometimes formed on a separate disc and secured to the number wheel. The digits have been formed on the peripheries of the number wheels in various ways. All of the methods heretofore employed in the production of such number wheels have involved considerable expense and it has been found that by the present invention the cost of producing such number wheels can be reduced considerably. The invention relates to the formation of the wheels, as will be explained more fully hereinafter with reference to the accompanying drawing in which the construction of the wheels and the method of forming the digits thereon is illustrated. In the drawing—

Figure 3:
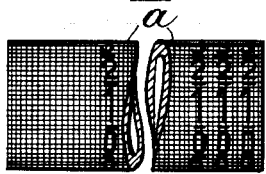
Figures 3 and 4 are detail views illustrating successive steps in the formation of the digit figures.
Figure 4:
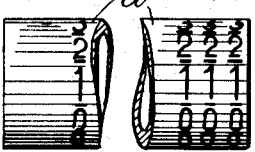
Figure 5:
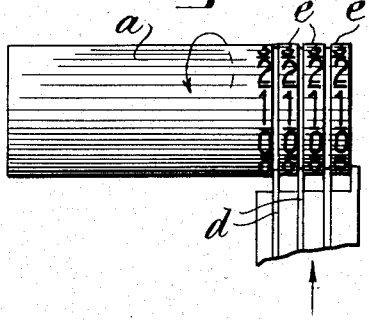
Figure 5 is a detail view illustrating another step in the formation of the number rings.
Figure 6:
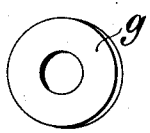
Figure 6 is a detail view in perspective of an internal spacing ring.
Figure 7:
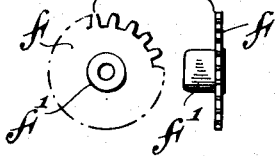
Figure 7 shows in front and edge views the driving gear and its hub.
Figure 8:
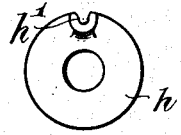
Figure 8 is a face view of the transmitting disc.
Figure 9:
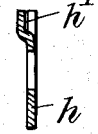
Figure 9 is a view of the transmitting disc in diametrical section.

As the first step in the formation of the number rings which with the gears and transmitting gears compose the number wheel, a tube $a$ of metal, of suitable quality and thickness, is placed on a mandrel $b$ and is rolled in contact, under substantial pressure, with a cylindrical die $c$ on which the digit figures, reversed, are formed in relief. In this manner the digit figures are formed on the tube in intaglio. The tube is subsequently cut between the rows of figures, as shown in Figure 5, as by a suitable tool indicated at $d$, so as to form separate number rings, but either before or after such cutting, as may be most convenient, the completion of the digit figures, so that they will be readily legible, is effected in the following manner: The intaglio figures on the rings are filled with a suitable paint, preferably by applying the paint to the rings, filling the figures and covering the adjacent surface, and is then wiped off, somewhat in the manner of manipulating an engraving plate, leaving the intaglio figures filled with the paint and the adjacent surface clean. Then the rings or tube as the case may be are coated with a suitable metal, as by electro-plating, the metal being deposited on the surface of the rings adjacent to the figures but not on the paint which fills the figures themselves. Thereby the figures are made to stand out in strong contrast with the adjacent surface and can be read easily. Figure 3 illustrates the step of filling the figures with the paint and Figure 4 illustrates the coating of the adjacent surfaces with the contrasting metal.

Figure 1:
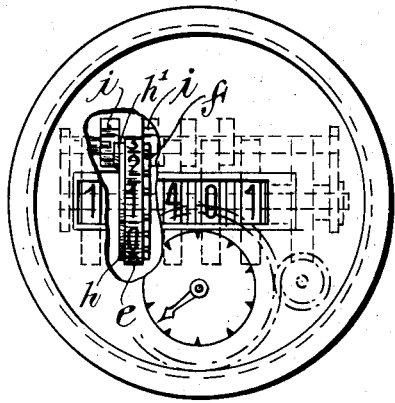
Figure 1 is a face view of a register constructed in accordance with the invention, a portion of the face plate being broken away to show more clearly the number wheels behind it.
Figure 2:
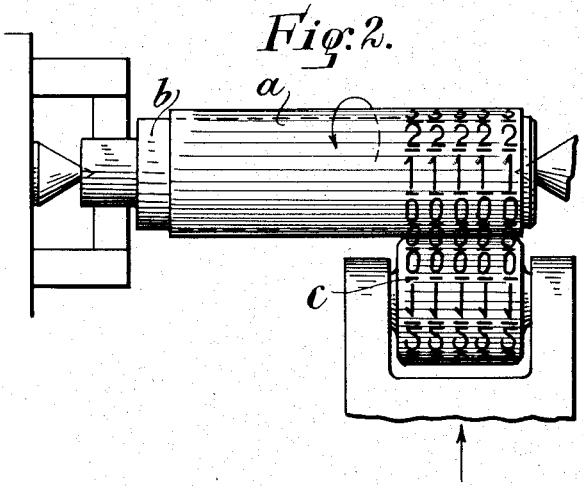
Figure 2 is a view illustrating the first step in the formation of the digits on the peripheries of the wheels.
Figure 10:
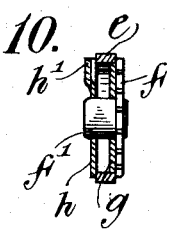
Figure 10 is a view partly in diametrical section and partly in elevation of the completed number wheel.
Figure 11:
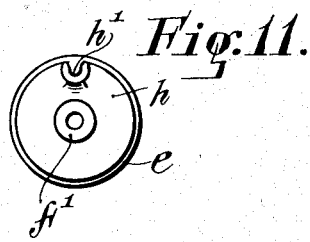
Figure 11 is a view of the same in elevation as seen from the left hand in Figure 10.

The number ring e formed as described, constitutes one element of the complete number wheel shown in Figures 1, 10 and 11. The other elements of the complete number wheel comprise a driving gear $f$ with its hub $f'$, a spacing ring $g$, and a transmitting disc or gear $h$. The driving gear $f$ is formed with the requisite number of teeth, usually twenty as indicated, for co-operation with the usual transmitting pinion $i$, shown in Figure 1 and its outside diameter is slightly greater than the internal diameter of the ring $e$ so that when the ring and gear are concentric the gear overlaps the ring slightly as shown in Figure 10. The gear $f$ can be conveniently stamped out. The transmitting disc or gear $h$, which may also be stamped out, is formed with transmitting teeth $h'$ for co-operation with the next transmitting pinion $i$. The hub $f'$ of the gear $f$ may be pressed into the gear. The spacing ring $g$ fits freely on the hub $f'$ and within the ring $e$.

When the several elements have been provided as described, the spacing ring $g$, the gear $f$ with its hub $f'$ and the ring $e$ are assembled, as shown in Figure 10, and the transmitting disc $h$ is then pressed on the hub $f'$ where it is held frictionally, thereby securing all of the elements of the number wheel together. The several elements of the number wheel can be produced at little expense and, by reason of the provision of the spacing ring, the several elements of the number wheel can be assembled easily and at the same time with perfect accuracy. The tight fit of the disc $h$ on the hub $f'$ is sufficient to hold all of the elements together with certainty.

I claim as my invention:

1. A number wheel comprising a number ring, discs at opposite sides of and overlapping the number ring, and a central hub upon which the discs are pressed and by which they are held together on opposite sides of the ring.

2. A number wheel comprising a number ring, discs at opposite sides of and overlapping the number ring, a spacing ring, and a central hub fitting freely within the spacing ring and upon which the discs are pressed and by which they are held together on opposite sides of the ring.

3. A number wheel comprising a number ring, a driving gear at one side of and overlapping the ring, a transmitting gear at the other side of and overlapping the ring, and a central hub holding the gears together on opposite sides of the ring.

4. A number wheel comprising a number ring, a driving gear at one side of and overlapping the ring, a transmitting gear at the other side of and overlapping the ring, a spacing ring within the number ring, and a central hub fitting freely within the spacing ring and having the driving gear and the transmitting gear secured thereto on opposite sides of the number ring.

This specification signed this 17th day of January, A. D. 1923.

WILLIAM L. MARDEN.